E. H. MATTSON.
AIRSHIP.
APPLICATION FILED JAN. 7, 1910.
1,039,160.                                    Patented Sept. 24, 1912.
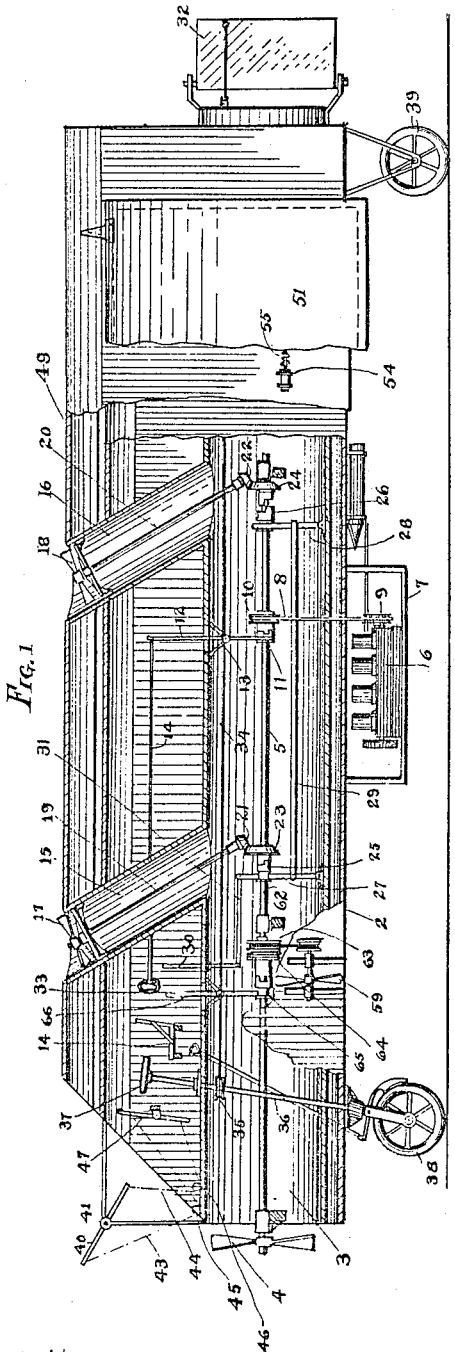
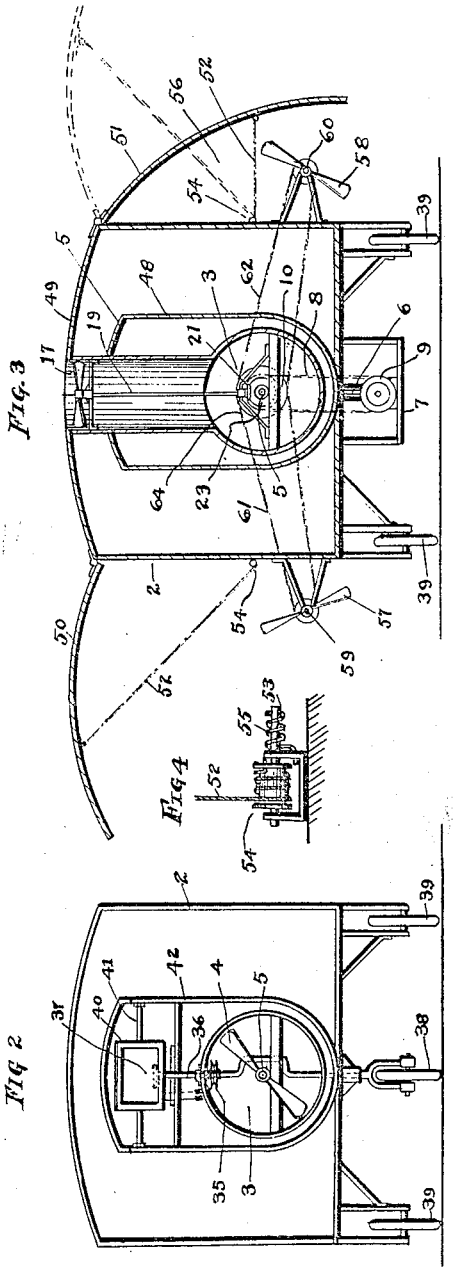
Witnesses
R. Enstrom
Edw. Swenberg
Inventor
Ernst H. Mattson
By J. Warner Peckham Atty.

UNITED STATES PATENT OFFICE.

ERNST H. MATTSON, OF CHICAGO, ILLINOIS.

AIRSHIP.

1,039,160.    Specification of Letters Patent.    Patented Sept. 24, 1912.

Application filed January 7, 1910. Serial No. 536,863.

*To all whom it may concern:*

Be it known that I, ERNST H. MATTSON, a citizen of the United States, residing at Chicago, in the county of Cook and State of Illinois, have invented certain new and useful Improvements in Airships, of which the following is a specification.

My invention relates to aerial navigation, and its object is to provide certain improvements in the heavier-than-air type.

With this end in view the invention consists in the novel construction and improvements in details, all as hereinafter described, illustrated in the drawing and incorporated in the appended claims.

In the drawing—Figure 1 is a side elevation partly in section and partly broken away of a craft embodying my invention. Fig. 2 is a front end view. Fig. 3 is a transverse section, and Fig. 4 a detail view.

In the several views, 2 represents the body of the ship. This body is in the form of a tube open at both ends in the lower part of which is an air-tube 3 extending from end to end of the body 2. In the forward end of the air-tube 3 is mounted a propeller 4 driven by a shaft 5 mounted on suitable bearings within said air-tube. This propeller is driven by an engine 6 suspended on a frame 7 from the lower side of the body 2. The driving connection between the engine and the propeller shaft 5 consists of a sprocket chain 8 or belt engaging an engine-pulley or sprocket wheel 9 and a similar wheel or pulley 10 loosely mounted on the shaft 5. Motion is communicated from the pulley 10 to the shaft 5 through a clutch 11 splined on said shaft 5 and engaged or disengaged from said pulley 10 by means of a lever 12 which is pivoted at 13 and operated by a rod 14 having a handgrip 13¹ within convenient reach of the driver's seat 14.

The object of the tube 3 is to confine the current of air produced by the propeller 4 in the form of a compressed column of air which shall issue with more propelling force from the rear end of the tube 3 than if the current produced by the propeller 4 were unconfined. This pressure in the tube 3 is augmented by pressures from a pair of tubes 15 and 16 which are forwardly inclined and open at their upper and lower ends to, respectively, the outer air and the tube 3. In the upper ends of these inclined tubes are propellers 17 and 18 that are suitably mounted on shafts 19 and 20 having bevel-gears 21 and 22 on their lower ends. These gears are in mesh with bevel-gears 23 and 24 that are rotatively mounted against longitudinal movement on the shaft 5. Rotary motion is communicated to the gears 23 and 24, and thus to the propellers 17 and 18, by means of clutches 25 and 26 which are splined to the shaft 5 and, like the clutch 11, are longitudinally movable on the shaft 5 so that they may be engaged with and disengaged from suitable complemental clutch portions on the gears 23 and 24. The clutches 25 and 26 are simultaneously operable through a pair of levers 27 and 28 which are pivoted at their lower ends to the bottom of the tube 3 and connected to move together by a connecting rod 29, the ends of which are pivoted to the respective levers 27 and 28. The lever 27, and therewith the lever 28, through the connecting rod 29, is operated by an operator's handlever 30 connected with said lever 27 through a connecting rod 31.

The propellers 17 and 18 with the air of their air-compression tubes exert a lifting force and at the same time, owing to their inclination, a forward pulling force. The currents of air produced by the lifting forces being delivered into the tube 3 approximately in the direction of the current produced by the propeller 3, will augment the pushing force of the current in the tube 3. At the rear end of the latter tube is mounted a rudder 32 which is operated to control the sidewise steering by means of a rope 34 passing over a pulley 35 secured to a shaft 36 provided at its upper end and in front of the driver's seat, with a steering wheel 37. On the lower end of the shaft 36 is mounted a ground wheel 38 which supports the forward end of the body 2 when the ship is resting on the surface of the earth. The same steering shaft thus serves to steer the ship in its movement over the starting or stopping field as well as after the ship has risen into the air. Wheels 39 support the rear end of the body 2. The vertical steering of the ship is accomplished by a plane 40 mounted on a shaft 41 having its end bearings in a frame-work 42 secured to the forward end of the ship. The plane 40 is swung by means of cords or flexible connections 43 and 44 passing over pulleys 45 and 46 to a lever 47 centrally pivoted in front of the driver's seat. The frame-work 42 may be duplicated at suitable distances apart, as at 48 to lend rigidity to the different parts of the body 2 and to properly sustain the tube 3 therein together with other details of the mechanism in any suitable manner. To the opposite edges of the roof 49 of the body 2 are pivoted wings 50 and 51 which extend along both sides of the body 2 and normally occupy a folded position as that shown occupied by the wing 51. These wings are connected to the body 2 by means of a series of ropes 52 wound upon shafts 53, such as shown partly in Fig. 5. Each rope is normally coiled upon a pulley 54 on each shaft so as to hold both wings in their folded position, as indicated at 51 in Fig. 3 and the shaft 53, upon which the pulley 54 is keyed, may be yieldingly held against movement that will uncoil the rope by means of spiral springs 55 secured to the body 2 and shaft, respectively. By thus yieldingly holding the wings folded the wings will automatically spread out to or toward the position occupied by the wing 50 in Fig. 3 in case of a sudden dropping movement of the vessel and act as parachutes, and be automatically returned to their folded position the moment a rapid downward movement is checked. Should the vessel suddenly tilt at one side, thus momentarily producing a drop movement substantially at only one side the wing on that side will act to right the vessel automatically. When the wings are folded there will be air-spaces between the wings and the body 2, as at 56 in Fig. 3.

Propellers 57 and 58 mounted on shafts 59 and 60, respectively, are mounted at the outer sides of the body 2 and the rearward currents of air produced by these propellers will partly operate to produce pressure against the upwardly inclined sides of the wings, these being held by the springs 55 to resist opening or spreading movements under such pressures. Power from the shaft 5 is transmitted to the shafts of the propellers 59 and 60 through belts 61 and 62 passing over a pair of loose pulleys 63 and 64 on the shaft 5. These pulleys are substantially one pulley and are provided with a clutch member to be engaged by a clutch member 65 splined to the shaft 5 and operated by a lever 66 in the same manner as the other clutches above referred to.

I claim as my invention and desire to secure by Letters Patent—

1. The combination with the body of the craft, of inclined and horizontal air-passages, the propellers arranged to create currents therein, hinged sides for said craft, said sides being normally folded as wings near the body of the craft, yielding means for supporting said sides in their normally folded positions, said means yielding to undue pressure of air against the undersides of said sides to permit said sides or wings to expand, and propellers arranged to drive a current of air between each of said sides and the body of the craft.

2. The combination with the body of the craft, of horizontal and inclined air passages communicating with each other and having a common outlet at the rear end of said horizontal air-passage, propellers arranged to create currents of air through said passages and exert lifting and forwardly propelling forces, hinged sides adapted to serve as wings for said craft, said sides or wings being normally folded and providing a space between each side or wing and the body of the craft, propellers arranged to create currents of air through said spaces, means supporting said wings in their normally folded position and permitting said wings to become outstretched under unusual air pressures, a driving engine, and clutch mechanisms whereby each system of propellers may be separately or all together set in motion by said engine.

In testimony whereof I have hereunto set my hand in the presence of two witnesses.

ERNST H. MATTSON.

Witnesses:
 R. ENSTROM,
 EDW. SWENBERG.